United States Patent [19]

Harats et al.

[11] Patent Number: 5,554,918
[45] Date of Patent: Sep. 10, 1996

[54] MECHANICALLY-REHARGEABLE BATTERY

[75] Inventors: Yehuda Harats; Jonathan R. Goldstein, both of Jerusalem, Israel

[73] Assignee: Electric Fuel (E.F.L.) Ltd., Jerusalem, Israel

[21] Appl. No.: 208,016

[22] Filed: Mar. 8, 1994

[51] Int. Cl.⁶ .................................................. H01M 10/28
[52] U.S. Cl. ................................ 320/2; 429/49; 429/28; 429/34; 429/185
[58] Field of Search .................... 429/206–207, 429/229–230, 27, 38, 66, 173–177, 166–167, 185, 158, 163, 152, 27–28, 7, 9, 93, 98, 99, 34, 180, 185, 209; 252/182.1; 320/2, 3, 4, 6, 15, 20, 21, 22, 23, 24, 43, 44

[56] References Cited

U.S. PATENT DOCUMENTS

| | | | |
|---|---|---|---|
| 3,513,030 | 5/1970 | Rosansky et al. | 136/86 |
| 3,682,706 | 8/1972 | Kohen | 136/86 |
| 3,759,748 | 9/1973 | Palmer | 429/147 |
| 3,963,519 | 6/1976 | Louie | 429/29 |
| 4,421,830 | 12/1987 | Schneider et al. | 429/49 |

FOREIGN PATENT DOCUMENTS

| | | |
|---|---|---|
| 0555978 | 8/1993 | European Pat. Off. . |
| 637746 | 5/1928 | France . |
| 906475 | 1/1946 | France . |
| 1152034 | 2/1958 | France . |
| 2009063 | 9/1970 | Germany . |
| 299591 | 11/1928 | United Kingdom . |
| 841052 | 7/1960 | United Kingdom . |

*Primary Examiner*—Peter S. Wong
*Assistant Examiner*—Aditya Krishnan
*Attorney, Agent, or Firm*—Helfgott & Karas, P.C.

[57] ABSTRACT

A mechanically-rechargeable single-cell consumer electric battery for generating up to two volts, the battery being capable of electrical recharge. The battery including a replaceable zinc anode, a housing containing the anode and provided with an aperture sealed by a removable closure, the aperture being sufficiently large to allow removal and replacement therethrough of at least the zinc anode, a cathode selected from the group including a manganese dioxide electrode, a nickel hydroxide electrode, a silver oxide electrode, and an air electrode also contained in the housing, a non-spillable electrolyte in contact with both cathode and anode, and a separator system physically separating the anode from the cathode.

16 Claims, 2 Drawing Sheets

5,554,918

MECHANICALLY-REHARGEABLE BATTERY

BACKGROUND AND SUMMARY OF THE INVENTION

The present invention relates to a rechargeable electric cell. More particularly, the invention is concerned with providing a mechanically-rechargeable single-cell consumer electric battery for generating up to two volts, mechanical recharging being effected by exchanging the zinc anode.

Electric batteries intended for use in flashlights, portable radios, toys, telephones, calculators and simlar uses may be defined as consumer batteries, in contrast to the larger batteries in industrial use, as for example for powering electric vehicles such as fork-lift trucks, standby batteries for computer systems and batteries found in hospitals for the operation of medical appliances.

Batteries are further classified as primary or secondary. Primary batteries are not electrically rechargeable. Examples of primary batteries are the Leclanche dry cell and the Magnesium ($Mg-MnO_2$) dry cell. Such batteries are discarded when exhausted and replaced with a new battery.

It is, however, to be noted that discarded batteries, particularly those containing mercury, have been found to cause substantial ecological damage, and in ecologically-aware countries such as Germany, disposal of batteries is allowed only into specially-provided containers.

In contradistinction to the primary type, batteries classified as secondary are electrically rechargeable, and justify their higher cost also by having higher power density, flat discharge curves and better low-temperature performance. Examples of secondary batteries are the lead-acid battery used in automobiles and the nickel-cadmium types.

Secondary batteries based on zinc typically use this metal as the negative electrode, have an alkaline electrolyte, a separator system, and a positive electrode either of manganese dioxide, nickel hydroxide or silver oxide. However, after 10 to 50 deep recharge cycles, even secondary batteries must be discarded due to a degradation in performance.

Zinc anodes are used in both primary and secondary batteries. Such batteries include the Leclanche, the alkaline manganese dioxide, in which the anode is zinc, the mercury cell, in which the anode is zinc and the cathode is mercuric oxide, the silver-zinc type, in which the cathode is silver oxide, the nickel-zinc type, in which the cathode is nickel hydroxide, among others.

With regard to zinc-anode secondary batteries, it has been found that the dominant cause of declining performance is the poor recyclability under electrical recharge of the zinc negative electrode, which results in a gradually lower output voltage and higher internal battery resistance after each recharge, until the unit is no longer able to power the appliance to which it is connected, whereafter the user discards the battery. Replacement costs are higher than for primary batteries.

In some cases, the cell will develop a short circuit as a result of zinc dendrites growing through to the positive electrode, and will consequently cease to function.

Examination and testing of the components of such failed cells have, however, yielded a significant result: the cell cathode is still in good condition and capable of further service.

As has been explained, even secondary batteries have a limited life. Whether or not this is of concern to the user depends on the amount of electrical power that is required. When a small battery is required for occasional use, as for example in electric test instruments, the cost of the battery to the consumer is of little significance. This is particularly so where the consumer is allowed to discard the used battery without being obliged to bear the cost of its environmentally-safe disposal, particularly for a battery containing toxic metals, such as cadmium and mercury.

The consumer will, however be more interested in lower total-life battery cost where the battery is larger, for use in applications such as in the operation of radios and larger tape recorders where more power is required.

It is known that for a specified current drain, a larger battery will achieve substantially longer life as measured in watt-hours per kilogram of battery weight, in comparison with a smaller battery of the same type. For example, Suppose a starting current drain of 15 milliamp is specified for a zinc-carbon cell. A small N size battery will have a service capacity of 24 hours only; the larger F size cell will operate for 520 hours, although weighing only about 10 times as much as the N cell.

Except in applications where there are severe weight or volume restrictions, it is, therefore, evident that a larger battery will serve the consumer in a more cost-effective manner than will a smaller battery. In order to offer the consumer a larger battery at a competitive cost, it is necessary either to use low-cost materials or to offer a battery with an outstandingly long service life.

In this regard, it is of interest to note that the more expensive systems, such as the nickel-metal hydride, and the lithium rechargeable types, are unavailable in the larger cell sizes such as the C size and above. Such cells would be economically unattractive to the user due to a combination of high material cost and limited rechargeability while the safety of such systems is still questionable, and consequently such batteries are not presently manufactured.

It is, therefore, one of the objects of the present invention to obviate the disadvantages of the prior-art battery cells and to provide an electric battery cell which provides an extended service life at a viable cost.

This the present invention achieves by providing a mechanically-rechargeable single-cell consumer electric battery for generating up to two volts, said battery being capable of electrical recharge and comprising a replaceable zinc anode; a housing containing said anode and provided with an aperture sealed by a removable closure, said aperture being sufficiently large to allow removal and replacement therethrough of at least said zinc anode; a cathode selected from the group consisting of manganese dioxide, nickel hydroxide, silver oxide, and air (oxygen) reduction types also contained in said housing; a non-spillable electrolyte in contact with both cathode and anode; and a separator system physically separating the anode from the cathode.

In a preferred embodiment of the invention, the aperture is sufficiently large to allow removal and replacement therethrough of said zinc anode and the cathode.

In another preferred embodiment of the present invention there is provided a rechargeable battery wherein the housing is at least as large as "C" cell, as defined by the American Standards Institute standard for cylindrical and flat zinc-carbon cells.

Preferably, the anode is composed of a slurry of zinc powder, pressed into a central current collector and optionally combined with an organic binder, such as carboxymethyl cellulose binder.

While most of the battery cells of the present invention require factory equipment for replacing the zinc anode, in a most preferred embodiment of the present invention there is provided a user-rechargeable electric battery cell wherein the removable closure and said housing are assembled by means of a matching screw thread, whereby the user can exchange the zinc anode without needing industrial tools.

For effective use of the battery cell of the present invention, means are also provided for differentiating between a battery which can still be electrically recharged and between a battery which has further deteriorated and should now undergo replacement of its zinc anode.

The battery cell of the present invention will also be of value in producing a cell of improved energy density.

Considering the energy density of the widely-used nickel-cadmium cell, it is known that such a cell will produce approximately 35 watt-hours per kilogram or 100 watt-hours per liter volume.

These figures would be approximately 75% higher were the cadmium replaced by zinc; however, this would only be economically justified for a battery which could be recharged sufficiently often to provide an extended service life. This requirement is provided for by the present invention.

The invention will be described in connection with certain preferred embodiments with reference to the following illustrative figures so that it may be more fully understood.

With reference to the figures, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
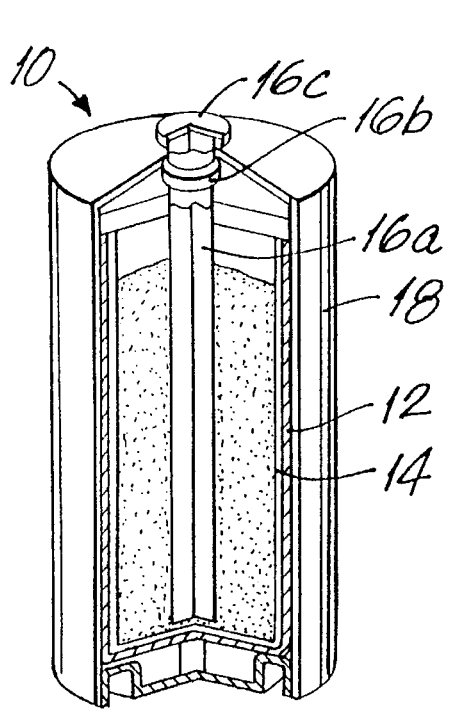
FIG. 1 is a perspective sectioned view of a preferred embodiment of the battery cell.
Figure 1A:
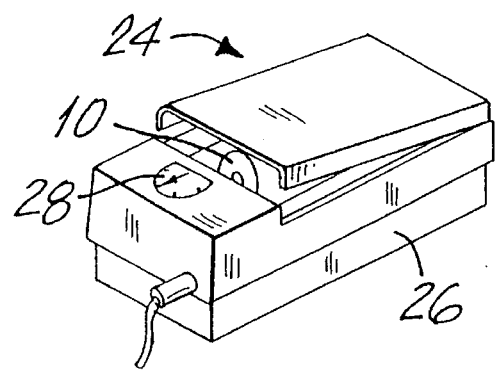
FIG. 1a is a perspective view of indicator means for use in conjunction with the battery cell.

There is seen in FIG. 1 in simplified form a mechanically-rechargeable single-cell consumer electric battery 10 for generating up to two volts. The battery illustrated is a cylindrical heavy-duty nickel-zinc cell providing 1.6 volts when new.

A replaceable zinc anode 12 is seen in this cell in the form of a zinc-coated metal foam in cylindrical form lined on its inner face with a zinc dendrite resistant separator 14, impregnated with electrolyte.

The cathode 16 is formed of a pressed mass of nickel hydroxide, graphite, and teflon binder. This cathode is supported by a central current collector 16a, which is taken through insulator means 16b to provide the positive terminal 16c at the top of the cell.

A housing 18 is provided with an aperture 20 sealed by a removable metallic closure 22, which is in electrical contact with the anode 12 and serves as the negative terminal at the base of the cell.

The aperture 20 is sufficiently large to allow removal and replacement therethrough of the zinc anode 12, and in fact can be made sufficiently large to allow removal and replacement therethrough of both said anode and the cathode 16.

In this embodiment, the removable closure 22 is retained by an interference fit.

Other parts of the battery, such as the nickel hydroxide or zinc electrode, plastic upper closure, and lower cup are known in the prior art and require no comment.

The closure 22 is provided with a recess 23 for allowing gripping for the purpose of disassembly, which is effected by gripping the housing 18 in a first die and gripping the closure 22 by a second die (dies not shown) and then applying machine tension between the dies. Such dies are stored at centralized locations at an appropriate service station, and are operated by personnel with the necessary skills to carry out anode replacement.

The battery 10 has a housing of a size corresponding to a standard cell size selected from the range between "AAA" to "D" cell sizes, as defined by the American Standards Institute standard for cylindrical and flat zinc-carbon cells. Preferably, the housing is at least as large as a "C" cell, as for economic reasons there is a more worthwhile cost saving in returning such cells to service. Advantageously, there are also provided display means 24 auxilliary to the cell, indicating whether the cell 10 requires mechanical recharging. A small battery charger 26, such as is commonly used for recharging nickel-cadmium batteries, is additionally provided with an indicator 28 measuring battery internal resistance. If a short circuit is detected, the user will know that the probable cause is a zinc dendrite growing from the anode to the cathode. Conversely, if the cell resistance is higher than the predetermined value appropriate to the particular type being tested, the user will know that the zinc anode had probably deteriorated. In both eventualities, the user will send the battery for anode replacement.

Figure 2:
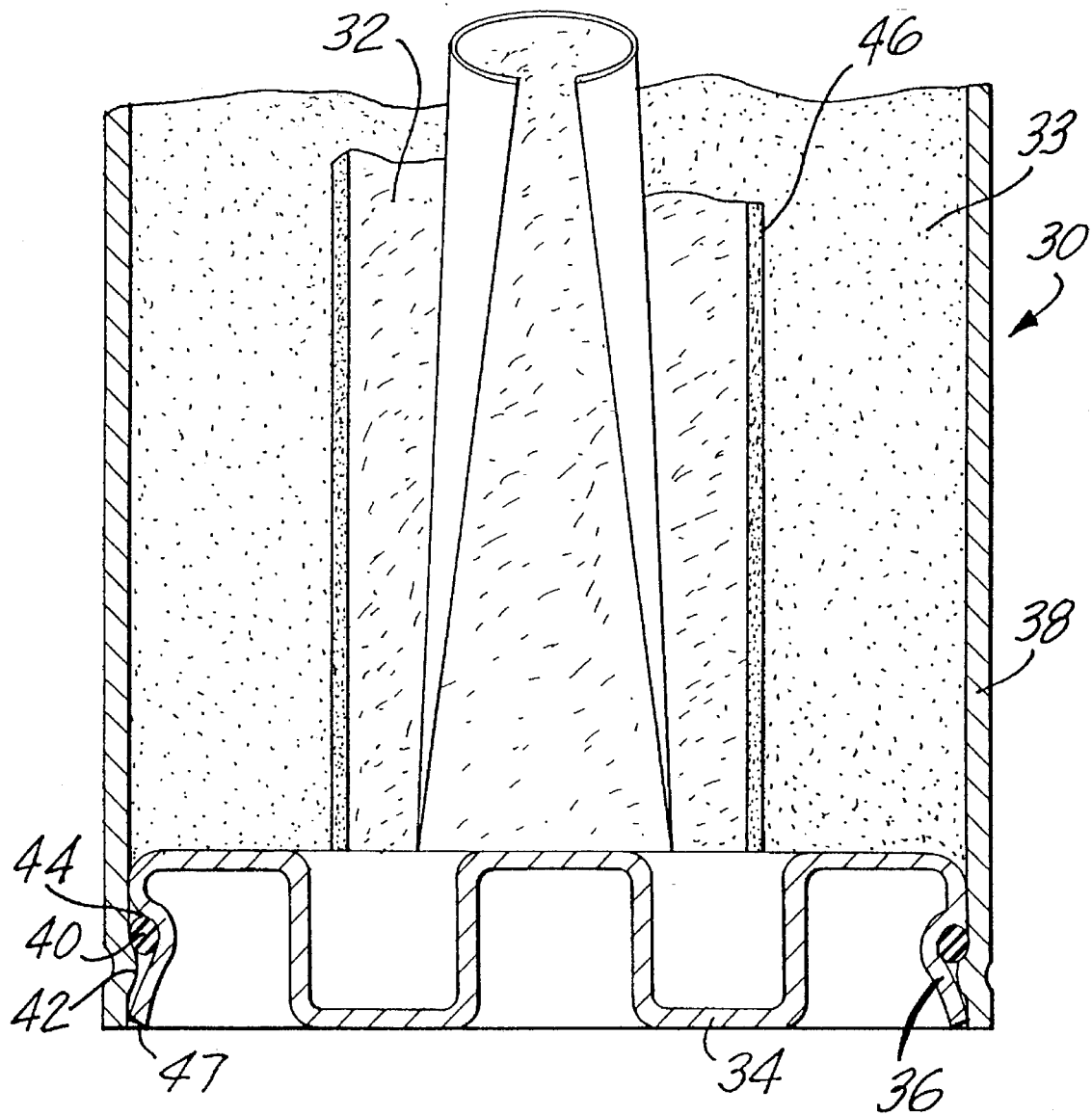
FIG. 2 is a sectional fragmented enlarged elevational view of a cell using a pressed zinc slurry anode.

Referring now to FIG. 2, there is seen a rechargeable battery 30 of the cylindrical alkaline manganese dioxide type.

In this embodiment the anode 32 is composed of a pressed slurry of zinc powder and alkaline electrolyte held by a carboxymethyl cellulose binder. The cathode 33 is formed from a mixture of manganese dioxide, alkaline electrolyte and carbon.

In a further embodiment (not shown) the anode 32 is composed of a paste of zinc oxide held by a teflon binder and is pressed onto a metal screen.

A removable closure 34 is retained by a peripheral detent 36 appearing in the outer steel housing 38.

Advantageously, there is further provided a sealing element 40 positioned between a face 42 of the housing 38 and a face 44 of the closure 34. The sealing element 40 ensures that the electrolyte moisture required for correct operation remains within the housing 38.

The separator 46, made of a non-woven fabric layer, coated with a zinc dendrite resistant film, is also replaceable by passage through the aperture 47.

Other parts of the cell, such as the brass current collector, the nylon seal and the potassium hydroxide electrolyte are as known in the prior art and require no comment.

Figure 3:
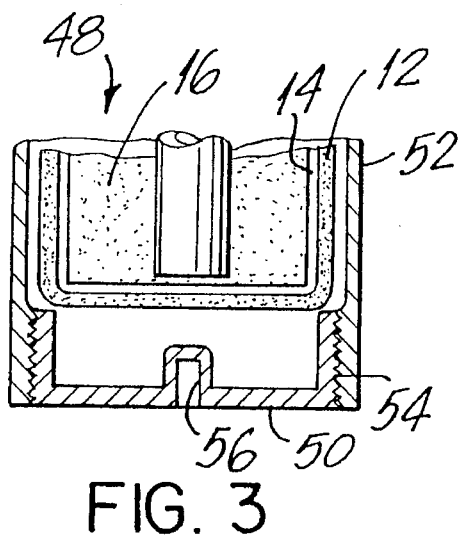
FIG. 3 is a sectional fragmented detail view of a cell provided with a closure removable by the user.

FIG. 3 shows a user-rechargeable electric battery cell 48, which is similar to the battery cell 10. However, a removable closure 50 and the outer housing 52 are assembled by means of a matching screw thread 54. A screwdriver slot 56 is provided in the closure 50. The cell 48 can thus be mechanically recharged by a user equipped with a tool available in every household.

Figure 4:
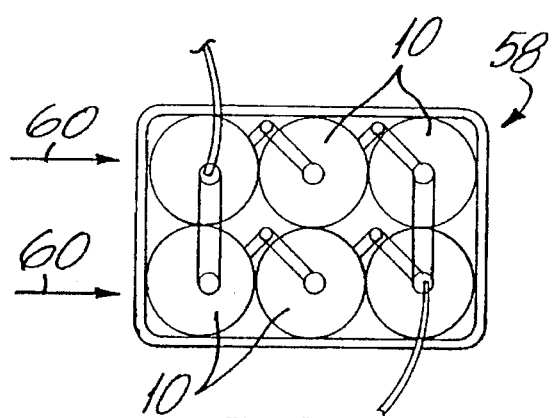
FIG. 4 is a plan view of an assembly of electric battery cells according to the invention.

Seen in FIG. 4 is an assembly 58 of electric battery cells 10. The assembly shown comprises 2 groups 60 of 3 cells each. The cells in each group are connected in series to provide an operating voltage of 4.5 v. The groups are connected in parallel to allow a higher current drain than would be viable using a single group.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A mechanically-rechargeable secondary single-cell consumer electric battery for generating up to two volts, said battery being capable of electrical recharge and comprising:
   a replaceable zinc anode;
   a housing containing said anode and provided with an aperture sealed by a removable closure, said aperture permitting removal and replacement therethrough of at least said anode;
   a cathode selected from the group consisting of a manganese dioxide electrode, a nickel hydroxide electrode, a silver oxide electrode, and an air electrode also contained in said housing;
   a non-spillable electrolyte in contact with both said cathode and said anode;
   a separator system physically separating the anode from the cathode; and
   a sealing element positioned between a face of said housing and a face of said closure for ensuring that electrolyte moisture required for correct operation remains within said housing.

2. A rechargeable battery as claimed in claim 1, wherein said aperture permits removal and replacement therethrough of said anode and said cathode.

3. A rechargeable battery as claimed in claim 1, wherein said anode is composed of a slurry of zinc powder pressed into a central current collector.

4. A rechargeable battery as claimed in claim 3, wherein said slurry is held by a carboxymethyl cellulose binder.

5. A rechargeable battery as claimed in claim 1, wherein said anode is composed of a paste of zinc held by a teflon binder and is pressed onto a metal screen.

6. A rechargeable battery as claimed in claim 1, wherein said anode is comprised of a zinc coated porous metal current collector.

7. A rechargeable battery as claimed in claim 6, wherein said current collector is composed of one of sintered compact, fiber mat, and foam porous metal.

8. A rechargeable battery as claimed in claim 1, wherein said removable closure is retained by an interference fit.

9. A rechargeable battery as claimed in claim 1, wherein said removable closure is retained by a peripheral detent.

10. A rechargeable battery as claimed in claim 1, wherein said housing is of a size corresponding to a standard cell size selected from the range between "AAA" to "D" cell sizes.

11. A rechargeable battery as claimed in claim 1, wherein said housing is at least as large as a "C" cell.

12. A rechargeable battery as claimed in claim 1, in conjunction with display means indicating whether said cell battery requires mechanical recharging.

13. A rechargeable cell as claimed in claim 1, wherein said separator is also replaceable by passage through said aperture.

14. A rechargeable battery according to claim 1, wherein said removable closure and said housing are assembled by means of a matching screw thread.

15. An assembly of electric battery cells, each cell of said assembly being capable of electrical recharge and comprising:
   a replaceable zinc anode;
   a housing containing said anode and provided with an aperture sealed by a removable closure, said aperture permitting removal and replacement therethrough of at least said anode;
   a cathode selected from the group consisting of a manganese dioxide electrode, a nickel hydroxide electrode, a silver oxide electrode, and an air electrode also contained in said housing;
   a non-spillable electrolyte in contact with both said cathode and said anode;
   a separator system physically separating the anode from the cathode; and
   a sealing element positioned between a face of said housing and a face of said closure for ensuring that electrolyte moisture required for correct operation remains within said housing.

16. A rechargeable battery as claimed in claim 1, wherein said anode is composed of a slurry of zinc powder pressed into a central current collector and combined with an organic binder.

* * * * *

UNITED STATES PATENT AND TRADEMARK OFFICE
CERTIFICATE OF CORRECTION

PATENT NO. : 5,554,918
DATED : September 10, 1996
INVENTOR(S) : Yehuda HARATS et al It is certified that error appears in the above-identified patent and that said Letters Patent are hereby corrected as shown below:

Title page, item [54], and column 1, line 1,

-- MECHANICALLY - RECHARGEABLE BATTERY --

Signed and Sealed this

Twenty-sixth Day of November 1996

Attest:

BRUCE LEHMAN

*Attesting Officer*     *Commissioner of Patents and Trademarks*